May 31, 1932.　　　W. E. CAIN ET AL　　　1,861,335
REMOTE CONTROL CONVEYER SWITCH
Filed July 3, 1930　　　2 Sheets-Sheet 1
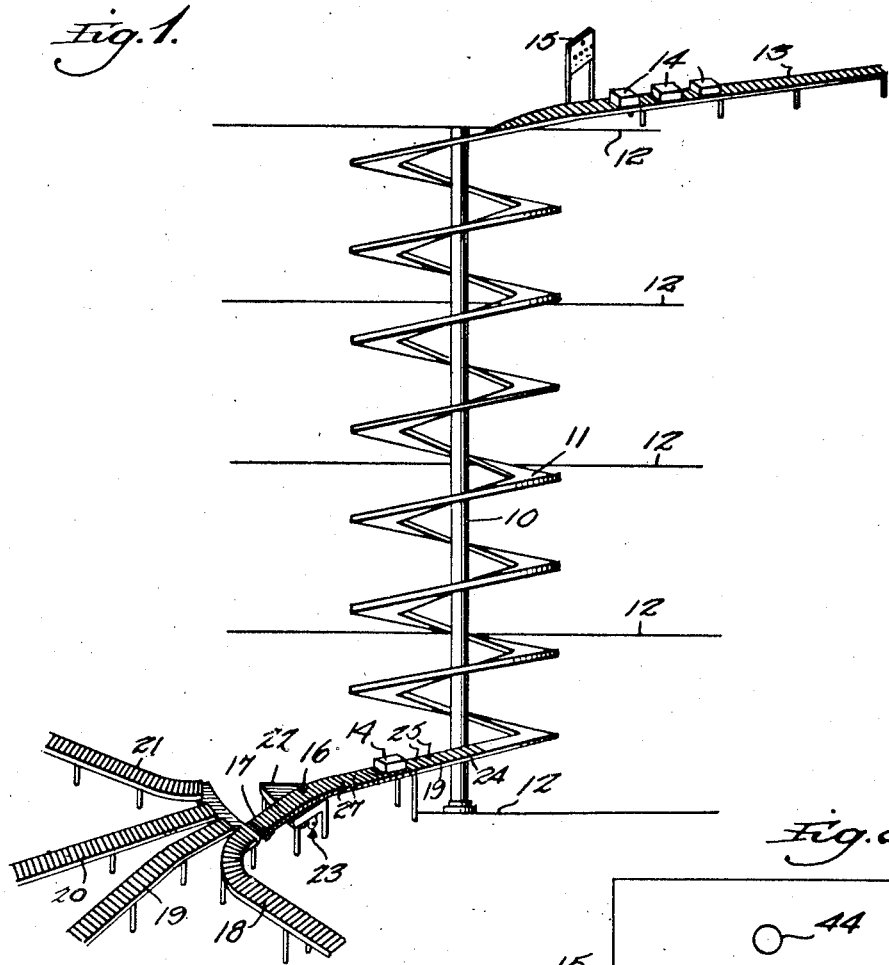
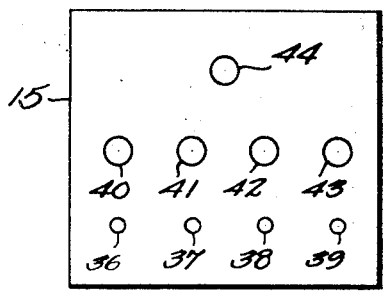
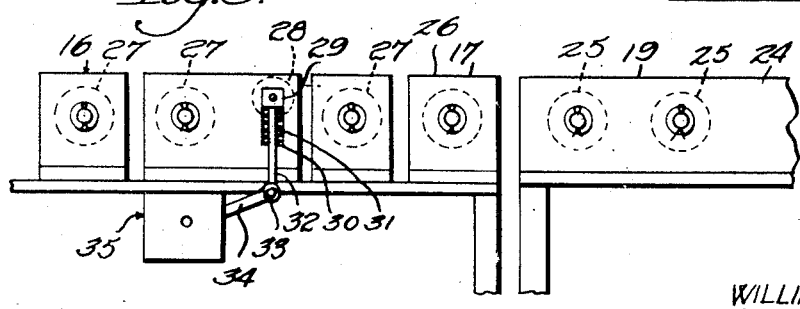
Inventor
WILLIAM E. CAIN
ALLEN E. CRADY
By C. L. Parker Jr.
Attorney

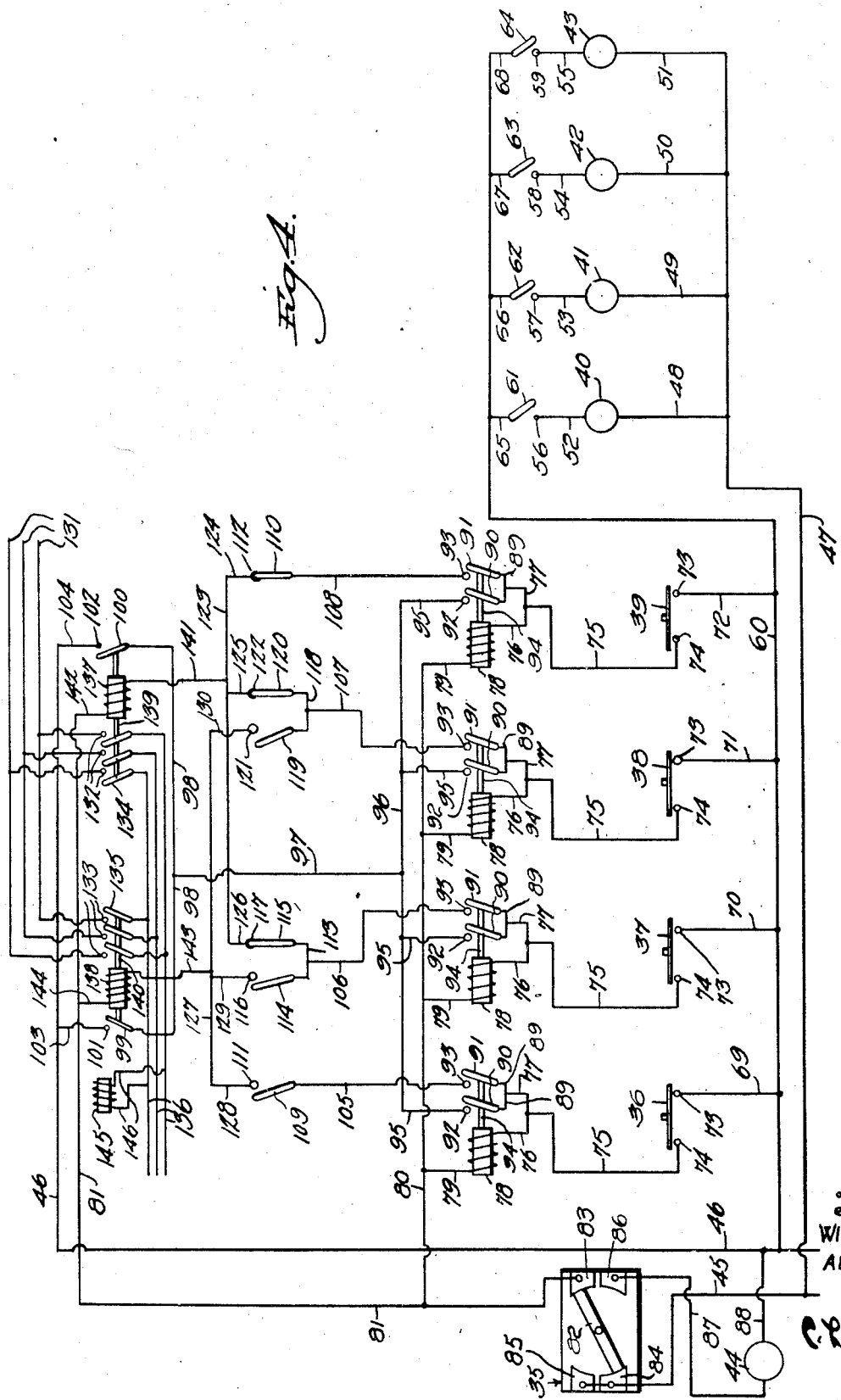

Patented May 31, 1932

1,861,335

UNITED STATES PATENT OFFICE

WILLIAM E. CAIN, OF JEFFERSONVILLE, INDIANA, AND ALLEN E. CRADY, OF LOUISVILLE, KENTUCKY, ASSIGNORS TO LOGAN CO., INC., OF LOUISVILLE, KENTUCKY, A CORPORATION OF KENTUCKY

REMOTE CONTROL CONVEYER SWITCH

Application filed July 3, 1930. Serial No. 465,765.

This invention relates to remote-control conveyer switches, and more particularly to means operative from a remote point to control the discharge of articles from a conveyer alligator switch to either of a plurality of take-off conveyers.

Conveyers have been in use for several years wherein a main conveyer connects at its discharge end to one end of a flexible conveyer section commonly known as an "alligator switch" and the free end of the flexible section is movable to discharge articles from the main conveyer to either one of a plurality of branch take-off conveyers.

It also has been more or less common practice to provide means actuated by the packages to selectively discharge them at the desired points, or to the desired branch take-off conveyers. Such conveyers usually operate by causing the package to contact with and actuate a trip mechanism of some character, while in one system an article carrier is used which is keyed to close a desired electrical circuit to determine the destination of the article carrier.

An example of the latter system is disclosed in the copending application of Henry R. Gotthardt and William E. Cain, Serial No. 395,167, filed September 25, 1929, for selective deflecting switches. In the application referred to, a motor is employed as the source of power for swinging the alligator switch to a position in alinement with either of a plurality of take-off conveyers. The motor shaft is connected by suitable drive means to the free end of the alligator switch to move the latter in accordance with the desired destination of the article carriers. Obviously, rotation of the motor shaft in one direction moves the free end of the alligator switch in one direction, while reverse movement of the alligator switch is accomplished by reverse rotation of the motor shaft. The article carrier is adapted to be keyed to determine the branch conveyer to which the carrier will be conveyed.

An important object of the present invention is to provide a conveying system of the alligator switch type referred to wherein means is provided for remotely controlling the movement of the alligator switch.

A further object is to provide a conveyer of the character referred to wherein articles of different classes may be loaded upon a main conveyer at a loading point remote from the alligator switch, and wherein means is provided for remotely controlling the movement of the alligator switch from such a point as the loading station at which articles are placed upon the conveyer.

A further object is to provide novel means for controlling the direction of rotation of the shaft of the motor employed for swinging the alligator switch in accordance with the selected discharge conveyer to which a given article is to be conveyed by the alligator switch.

A further object is to provide a conveyer system of the character just referred to wherein the control mechanism for the motor is maintained in operation to move the alligator switch to the desired take-off conveyer and to stop it in its proper position, upon a single momentary closing of an actuating circuit.

A further object is to provide a signalling system for a conveyer of the character referred to whereby the position of the alligator switch is suitably indicated to the operator at the remote point of control, and whereby the discharge of an article from the alligator switch to the selected take-off conveyer will be indicated to the operator so that he may reset the alligator switch to determine the destination of an article of a different class.

Other objects and advantages of the invention will become apparent during the course of the following description.

In the drawings we have shown one embodiment of the invention. In this showing,

Figure 1 is a diagrammatic perspective view of the conveyer system,

Figure 2 is a face view of the control board,

Figure 3 is a fragmentary side elevation of the free end of the alligator switch and the adjacent end of one of the take-off conveyers, and, Figure 4 is a diagrammatic view of the wiring system.

In the drawings we have illustrated a gravity conveyer of the spiral type whereby articles from an upper floor of the building may be conveyed to a lower floor and discharged selectively to a plurality of take-off conveyers, the discharge of the articles to the take-off conveyers being controlled from a point adjacent the loading station of the conveyer on the upper floor of the building. It will become apparent, however, that the invention is not limited in any way to its application either to a spiral conveyer or to a gravity conveyer, but is adapted for general application to conveyer systems. It also will be apparent that the system also is applicable whether the loading station and the alligator switch are on the same or different floors of a building.

Referring to Figure 1, the numeral 10 designates a vertical support to which successive turns of a spiral conveyer 11 are connected by any suitable means (not shown). Successive floors of the building are diagrammatically represented by the horizontal lines 12, and with the installation illustrated it will be apparent that articles are adapted to be conveyed from the fifth floor of the building to the first floor. It will be apparent that articles may be conveyed from any upper floor of a building to a lower floor by a gravity conveyer, or they may be conveyed between different points on the same floor or from a lower to an upper floor by means of a live roller or other power conveyer.

In the embodiment of the invention illustrated, the upper end of the spiral conveyer is connected to what may be termed a loading station conveyer 13, and in Figure 1 of the drawings a plurality of articles or packages 14 are shown in position on the loading station conveyer. Adjacent the loading station, a control board 15 is arranged, and this board is operative in a manner to be described for determining the destination of the articles, and for other purposes to be referred to.

The other end of the spiral conveyer is connected to one end of an alligator switch 16, the free end 17 of which is movable into registration with either of a plurality of branch take-off conveyers 18, 19, 20 and 21 which will be referred to hereafter as the first, second, third and fourth discharge stations. The alligator switch is shown generally as having a portion movable across a platform 22 beneath which is arranged operating mechanism indicated as a whole by the numeral 23.

The various conveying elements referred to form no part of the present invention except in the general combination claimed. The alligator switch and its operating mechanism may be of any suitable type such, for example, as the type disclosed in the copending application Serial No. 395,167, previously referred to. In the latter application, the alligator switch is generally disclosed as having a free end portion including a plurality of conveyer rollers of fixed parallel relationship, the remaining rollers being adapted to assume radial positions to form continuations of the free end portion of the alligator switch and the portion of the main conveyer to which the alligator switch is connected. Accordingly it will be understood that the free end 17 of the alligator switch illustrated in Figure 1 is adapted to swing into alinement with either of the discharge conveyers.

Referring to Figure 3, it will be noted that each of the discharge conveyers, as, for example, the conveyer 19, includes side rails 24 between which are journalled conveyer rollers 25. Similarly the free end portion of the alligator switch includes supports 26 having conveyer rollers 27 journalled therebetween. The alligator switch also is provided with a floating roller 28 journalled in bearings 29 vertically movable in slots 30 formed in the supports 26. Springs 31 normally urge the roller 28 upwardly and articles passing over the floating roller are adapted to depress it against the tension of the springs 31.

One of the bearings 29 of the floating roller is connected to a depending arm 32 and the lower end of this arm is connected as at 33 to a switch actuating arm 34. This arm is adapted to actuate switch mechanism indicated as a whole by the numeral 35, and referred to in detail later.

As previously stated, a control board 15 is arranged adjacent the loading station, and the general make-up of this board is illustrated in Figure 2 of the drawings. This board carries a plurality of push buttons 36, 37, 38 and 39 which are operative in a manner to be described to move the free end of the alligator switch into alinement with each of the discharge stations. For example, depression of the button 36 will cause the alligator switch to swing into alinement with the discharge station 18, depression of the button 37 causes discharge of articles to the discharge station 19, etc.

The control board also carries a plurality of indicating lights 40 to 43 inclusive which are adapted to be automatically illuminated in a manner to be described to indicate the position of the free end of the alligator switch. For example, if the alligator switch is in alinement with the discharge station 18 the light 40 will be illuminated. If the button 38 is then depressed, the alligator switch will be caused to move to a position in alinement with the discharge station 20, and movement of the alligator switch will cause the lights 41 and 42 to be successively illuminated, and the latter light will remain illuminated until one of the other buttons of the control board is operated. When a package is discharged to either of the discharge stations, movement of the package depresses the floating roller 28 and closes a circuit controlled by the switch 35, and under such circumstances a signal light 44, carried by the control board, will be illuminated to indicate that the article has been properly discharged, and that the alligator switch is ready to be reset whenever desired.

The wiring system for the apparatus is diagrammatically illustrated in Figure 4 of the drawings. Line wires 45 and 46 lead from a suitable source of current as will be apparent. The line wire 46 is connected by a wire 47 to branch wires 48 to 51 inclusive leading to the indicating lights 40 to 43 inclusive. The other terminals of the lights are connected by wires 52 to 55 inclusive to stationary contacts 56 to 59 inclusive. A lead wire 60 is connected from the line wire 46 to a plurality of switch arms 61 to 64 inclusive through branch wires 65 to 68 inclusive. The switches 61 to 64 inclusive may be of any desired type and they are arranged respectively adjacent the entering ends of the discharge stations, and accordingly it will be apparent that one of the switches will be closed by the alligator switch when the latter is in alinement with one of the discharge stations. For example, when the alligator switch is in alinement with the discharge station 18, the switch 61 will be closed, and accordingly the light 40 will be illuminated.

The push buttons 36 to 39 inclusive, previously described, are illustrated in Figure 4 as being connected to the lead wire 60 through branch wires 69 to 72 inclusive. The push buttons are adapted to be moved into engagement with contacts 73 and 74, as will be apparent. The contacts 74 of the push buttons are respectively connected to wires 75, each of which connects at its opposite end to two branch wires 76 and 77. Each of the branch wires 76 is connected to one end of the winding of a solenoid 78, the opposite end of each solenoid being connected by a branch wire 79 to a common wire 80 leading to a main wire 81.

The switch 35 previously described as being operative by the floating roll 28 includes a pivoted switch arm 82 normally engaging contacts 83 and 84. The wire 81 is connected to the contact 83 as shown, while the contact 84 is connected to the main supply wire 45. The switch arm 82 is movable into engagement with a contact 85 and a corresponding contact 86. The contacts 84 and 85 are connected to each other as shown, while the contact 86 is connected by a wire 87 to the signal light 44. This light has its other terminal connected by a wire 88 to the line wire 46.

Each wire 77 is connected to a wire 89 the ends of which lead to switch arms 90 and 91, movable into engagement with contacts 92 and 93. The switch arms referred to are connected to the armatures 94 of the solenoids 78, and accordingly it will be apparent that energization of either solenoid is adapted to move the switch arms 90 and 91 into engagement with the associated contacts 92 and 93.

The contacts 92 are connected by branch wires 95 to a common connecting wire 96 and this wire leads to a supply wire 97 connected intermediate the ends of a branch wire 98. The ends of the branch wire referred to are connected respectively to switch arms 99 and 100 adapted to be moved respectively into engagement with contacts 101 and 102. Lead wires 103 and 104 connect the contacts 101 and 102 to the line wire 46.

The several contacts 93 are connected respectively to wires 105 to 108 inclusive. These wires are connected to limit switches which are actuated by the conveyer in its movement between the various discharge stations. The wires 105 and 108 are connected to switch arms 109 and 110 which are adapted to be brought into engagement with contacts 111 and 112. The two limit switches referred to obviously correspond to the outermost discharge stations, namely the stations 18 and 21.

The wire 106 is connected intermediate the ends of a branch wire 113 connected between switch arms 114 and 115, and these switch arms are adapted to be brought into engagement with stationary contacts 116 and 117. Similarly, the wire 107 is connected intermediate the ends of a branch wire 118 which connects a pair of switch arms 119 and 120. The latter pair of switch arms are movable into engagement with contacts 121 and 122. A wire 123 connects the contacts 112, 122 and 117 through wires 124, 125 and 126. Similarly, a common wire 127 connects the contacts 111, 116 and 121 through branch wires 128, 129 and 130.

The motor for effecting movement of the alligator switch section is not shown, but it will be apparent that it operates in a manner similar to the operation of the motor shown and described in the copending application Serial No. 395,167, previously referred to. The motor is preferably supplied with current from a 440 volt three phase power input line represented by the wires 131. These wires lead to two sets of contacts 132 and 133 adapted to be engaged respectively by reversing switch arms 134 and 135. The reversing switch arms are connected in the usual manner to the three wires 136 leading to the motor, as will be understood.

Solenoids 137 and 138 are provided with armatures 139 and 140 connected to the respective switch arms 134 and 135. Similarly the armature 139 is operatively connected to the switch 100 while the armature 140 is connected to the switch 99. One end of the winding of the solenoid 137 is connected through a wire 141 to the common wire 123, while the other end of this winding is connected to the supply wire 81 by a wire 142. In a similar manner, the winding of the solenoid 138 is connected across the wires 127 and 81 by wires 143 and 144.

The motor employed for swinging the alligator switch is provided with a magnetic brake including a solenoid 145 connected by wires 146 across two of the wires 136. The magnetic brake is of the type which is released from the motor when energized, and which, when deenergized, operates by spring pressure to stop rotation of the motor shaft. The brake per se forms no part of the present invention, except in the general combination, and need not be referred to in detail.

The operation of the apparatus is as follows:

The limit switches for the outermost discharge stations require only single switch arms, while those of the intermediate stations require two switch arms each, as illustrated in Figure 4. It will be apparent that when the alligator switch is arranged at any intermediate station, the limit switches 109 and 110 will be closed. Obviously, either of the outermost limit switches will be opened only when the alligator switch reaches the corresponding position.

Different operating conditions exist, however, in connection with the intermediate limit switches. For example, if the alligator switch should be arranged in its first position, that is, in alinement with the discharge station 18, the limit switch 109 will be open. Accordingly it would be necessary to rotate the motor armature in one direction to move the alligator switch to the second position, while it would be necessary to rotate the motor in the opposite direction to move the alligator switch to the second position if it is already in the third or fourth position. Accordingly only one of the switch arms 114 and 115, or 119 and 120 will be closed at a given time, depending upon the side of the intermediate station to which the alligator switch has been previously arranged.

With the parts in the position shown in Figure 4, the alligator switch is in position one, and accordingly switches 115, 120 and 110 are closed so that completion of either of the circuits associated with these switches will cause the motor to rotate in the proper direction to move the alligator switch toward the position selected. If the alligator switch were arranged in the fourth position, switches 110, 120 and 115 would be open and switches 109, 114 and 119 would be closed so that the closing of the circuits associated with these switches would cause the motor to rotate in the proper direction to move the alligator switch to the first, second or third positions according to the discharge station selected.

It is believed that this general discussion will be helpful in an understanding of the following specific description of the operation of the apparatus.

As previously stated, the limit switches will assume the positions illustrated in Figure 4 when the alligator switch is in the first position, that is, the position corresponding to the switch 109, in alinement with the discharge station 18. Assuming that it is desired to convey an article from the loading station 13 to the discharge station 20, the operator will depress push button 38, associated with the third station. When this is done, current will flow from line wire 46 through feed wire 60 and branch wire 71, thence through push button 38 to wire 75, through wire 76 and the winding of the corresponding solenoid 78, thence back to the source through wires 79, 80 and 81, switch arm 82, contact 84 and line wire 45. This action obviously will energize the third solenoid 78 to attract its armature and close the corresponding switches 90 and 91.

At the same time, current will flow through the corresponding contact 93 and wires 107 and 118 to the switch 120, through contact 122, wires 125, 123 and 141, through solenoid 137, and thence back to the source through wires 142 and 81, and through the elements of the switch 35 in the manner previously described. This action energizes solenoid 137 to close the switch arm 100 and the plurality of switch arms 134, and thus current will be supplied to the motor to rotate the armature thereof in one direction to move the alligator switch from the first position toward the third position.

The push button 38 need be closed only momentarily since the completion of the circuits referred to provides a holding circuit for the previously energized solenoid 78. The closing of the switch arm 100 completes a circuit through wires 46 and 104, switch 100, wires 98 and 97, wire 96, the wire 95 associated with the third solenoid 78, through the corresponding switch 90, wires 89, 77 and 76, through the winding of the corresponding solenoid 78, and thence back to the source through wire 79, 80 and 81, and the switch 35.

Thus it will be apparent that as soon as the push button 38 is actuated, the corresponding solenoid 78 will be energized, and a holding circuit will be provided for the solenoid to maintain it energized after the push button 38 is released. Under the conditions assumed, the energization of the motor will cause the alligator switch to move from the first position through the second position. As the alligator switch leaves the first position the switch 109 will return to closed position. As the switch moves through the second position, the switch 114 will be closed and the switch 115 opened. None of the circuits associated with these two switches will have been closed, however, and the operation of the parts will not be affected. Accordingly the alligator switch continues to move until it reaches the third position at which time it will close the switch 119 and open the switch 120. The previously described circuit through the reversing solenoid 137 depends for its completion upon the closing of the switch 120, and the closing of the switch 91 associated with the third solenoid 78. Accordingly, when the alligator switch reaches the third position, the circuit through the solenoid 137 will be broken by the opening of the switch 120. This operation stops the motor as will be apparent.

As previously stated, the magnetic brake is of the type applied by spring pressure and released upon energization of its solenoid 145. Accordingly, the brake will have been released during operation of the motor, and will become operative to stop the motor promptly upon the opening of the switch 120. Thus the alligator switch will be correctly alined with the discharge station 20.

The opening of the circuit through the switch 120 in the manner described will not have affected the holding circuit through the third solenoid 78, and accordingly this solenoid will remain energized. The article intended to be conveyed to the third discharge station will move downwardly along the spiral conveyer 11 to the alligator conveyer, from which it will be discharged to the branch take-off conveyer 20. As the article passes over the free end of the alligator conveyer it will depress the floating roller 28, thus swinging the arm 34 and moving the switch 82 from the position shown in Figure 4 to a position in engagement with the contacts 85 and 86.

The previously described holding circuit for the third solenoids 78 depends for its completion upon the arrangement of the switch arm 82 in the position illustrated. Accordingly the holding circuit will be broken upon movement of the switch arm 82 to its other position, and the previously operated switches 90 and 91 will return to normal position. At the same time, current will flow through wire 45 to contact 85, through switch arm 82 to contact 86, through wire 87 and signal light 44, and thence back to the source through wire 88 and line wire 46. Thus the operator will receive a signal to the effect that the previous article has been discharged, and that the conveying system is ready to be reset if desired to convey an article to a different discharge station.

As previously stated, the switch 119 will be closed instead of the switch 120 when the alligator switch is arranged in the fourth position, that is, the position corresponding to switch 110, and the latter switch obviously will be open. If the push button 38 should be depressed under such circumstances, obviously it will be necessary for the motor armature to rotate in the direction opposite to that previously described in order to move the alligator switch to the third position.

Under the conditions referred to, the solenoid 138 will be energized instead of the solenoid 137 since the switch 119 will be closed and the switch 120 open. Thus it will be apparent that the switches 135 will be closed by the solenoid 138, and the motor will operate in the desired manner to move the alligator switch from the fourth position to the third position. It also will be apparent that the holding circuit for the third solenoid 78 will be completed through the switch 99 instead of the switch 100. In other words, the operation which takes place to move the alligator switch to the third position from any other position will be the same in every case except that the motor will rotate in opposite directions according to the direction of movement necessary to bring the alligator switch to its third position.

The operation necessary to bring the alligator switch to the second position will take place upon actuation of the push button 37, and is identical with the operation previously described. Accordingly this operation need not be referred to in detail. Obviously, there is only one direction from which the alligator switch can approach either the first or fourth positions, and accordingly only one limit switch is necessary for these positions. The switch 109 is adapted to energize the solenoid 138, while the switch 110 under proper operating conditions will energize the solenoid 137, and accordingly the motor will operate in the proper direction, when desired, to move the alligator switch to either of the outermost positions.

As previously stated, one of the switches 61 to 64 inclusive will be closed when the alligator switch is in alinement with one of the discharge stations. Thus it will be apparent that the operator at the loading station readily may determine the position of the alligator switch. For example, if the alligator switch is in the second position, the light 41 will be illuminated. Accordingly, if it is desired to discharge an article to the second discharge station, it is immediately apparent to the operator that no resetting of the alligator switch is necessary, and movement of the article may be started. On the other hand, if it is desired under such conditions to dispatch an article to either of the other stations, it will be immediately apparent to the operator that resetting of the alligator switch is necessary, and the operator merely will be required to actuate the proper push button.

The system is readily operable whereby articles may be conveyed from a given point to a distant point and distributed from the latter point to either of a plurality of branch take-off conveyers. Proper setting of the alligator switch may be accomplished by the operator very readily by the mere expedient of pressing a push button, and a suitable signal is given to the operator by illumination of the signal light 44 when the article is discharged to the previously selected branch take-off conveyer.

The system is relatively simple in construction, and it permits the remote control of a conveyer switch to determine the destination of an article without the use of tripping mechanisms actuated by the article. The system also is advantageous for many uses over the system disclosed in the copending application Serial No. 395,167, since it is unnecessary to place articles to be conveyed in a carrier, and to key the carrier in accordance with the desired destination thereof.

As previously stated, the system has been illustrated in its application to a gravity conveyer of the spiral type, but it readily will be apparent that the invention is equally applicable to other types of gravity conveyers, and also to live roller and other positively driven conveyer systems.

It is to be understood that the form of the invention herewith shown and described is to be taken as a preferred example of the same and that various changes in the shapes, size and arrangement of parts may be resorted to without departing from the spirit of the invention or the scope of the subjoined claims.

We claim:

1. Apparatus of the character described comprising a main conveyer, a switch section having one end connected to said main conveyer and its opposite end movable to either of a plurality of discharge points, means for effecting movement of the last named end of said switch section, means for rendering said last named means operative for moving the last named end of said switch section to a selected discharge point, means operative automatically when said switch section reaches the selected discharge point for rendering said first named means inoperative, and brake means automatically operative when said switch section reaches the selected discharge point for preventing overrunning of said switch section.

2. Apparatus of the character described comprising a main conveyer, a switch section having one end connected to said main conveyer and the opposite end movable to either of a plurality of predetermined discharge points, mechanical means including a reversible motor for moving the last named end of said switch section to either of said discharge points, control means for said motor, and means automatically operative when the last named end of said switch section reaches the selected discharge point for breaking the circuit through the motor.

3. Apparatus of the character described comprising a main conveyer, a switch section having one end connected to said main conveyer and the opposite end movable to either of a plurality of predetermined discharge points, mechanical means including a reversible motor for moving the last named end of said switch section to either of said discharge points, control means for said motor, means automatically operative when the last named end of said switch section reaches the selected discharge point for breaking the circuit through said motor, and brake means rendered operable by the breaking of the circuit through said motor for preventing the last named end of said switch section from overrunning the selected discharge point.

4. Apparatus of the character described comprising a main conveyer, a switch section having one end connected to said main conveyer, the opposite end of said switch section being movable to either of a plurality of predetermined discharge points, mechanical means including a motor for moving the last named end of said switch section to either of said discharge points, a pair of reversing switches for said motor, control circuits for said switches including control switches, selecting switches manually operable for selecting a discharge point to which the last named end of said switch section is to be moved, said control switches being automatically operable whereby the operation of a selecting switch will close the proper reversing switch and thus operate the motor to move said switch section in the proper direction toward the selected discharge point, and means for opening the circuit through said motor when said switch section reaches the selected discharge point.

5. Apparatus of the character described comprising a main conveyer, a switch section having one end connected to said main conveyer and its opposite end movable to either of a plurality of predetermined discharge points, mechanical means including a reversible motor for moving the last named end of said switch section to either of said discharge points, a pair of reversing switches for said motor, means operative for controlling said switches to render said motor effective for moving the last named end of said switch section toward either of said discharge points, and means rendered operative upon the initiation of the operation of said last named means when the last named end of said switch section reaches the last mentioned discharge point for breaking the circuit through the motor.

6. Apparatus of the character described comprising a main conveyer, a switch section having one end connected to said main conveyer and its opposite end movable to either of a plurality of predetermined discharge points, mechanical means including a reversible motor for moving the last named end of said switch section toward a selected discharge point, a pair of reversing switches for said motor, manually operable means for selecting the discharge point toward which said switch section is to be moved, said last named means being operable for closing only one of said reversing switches according to the selected direction of movement of said switch section, a holding circuit for retaining the selected reversing switch closed upon operation of said manually operable means, and means for breaking said holding circuit when said switch section reaches the selected discharge point.

7. Apparatus of the character described comprising a main conveyer, a switch section having one end connected to said main conveyer and its opposite end movable between a plurality of predetermined discharge points, mechanical means including a reversing motor for moving the last named end of said switch section toward any discharge point, a pair of reversing switches for said motor, a pair of circuits each including a solenoid operative when energized for holding the associated reversing switch in closed position, selecting means manually operative for determining a selected discharge point toward which said switch section is to be moved, said selecting means being automatically operative for closing one circuit of said pair to operate one of said reversing switches according to the direction of movement of said switch section toward the selected discharge point, and means operative when said switch section reaches the selected discharge point for opening the previously energized circuit of said pair of circuits.

8. Apparatus constructed in accordance with claim 7 provided with a brake for said mechanical means automatically operative upon the opening of either of said reversing switches for preventing the overrunning of said switch section beyond the selected discharge point.

9. Apparatus constructed in accordance with claim 7 provided with control switches operative by said switch section in its movement between the selected discharge points for determining which of said pair of circuits shall be closed upon operation of said selecting means.

10. Apparatus of the character described comprising a main conveyer, a switch section having one end connected to said main conveyer and its opposite end movable between a plurality of predetermined discharge points, mechanical means including a reversing motor for moving the last named end of said switch section toward any discharge point, a pair of reversing switches for said motor, a pair of circuits each including a solenoid operative when energized for holding the associated reversing switch in closed position, selecting circuits each including a selecting switch manually operative for determining the discharge point to which said switch section is to be moved, said selecting circuits being operative for closing one circuit of said pair to operate one of said reversing switches according to the direction of movement of said switch section toward the selected discharge point, holding circuits operative upon the momentary closing of said selecting switches for holding the selected circuit of said pair closed, and means operative when said switch section reaches the selected discharge point for opening the previously energized holding circuit.

11. Apparatus constructed in accordance with claim 10 provided with control switches arranged in the circuits of said solenoids and operative by said switch section in its movement between the selected discharge points for determining which of said reversing switches shall be closed upon operation of one of said selecting switches.

12. Apparatus of the character described comprising a main conveyer, a switch section having one end connected to said main conveyer, means for effecting movement of the opposite end of said switch section to either of a plurality of predetermined discharge points, means remote from said switch section for controlling said first named means, and signalling means adjacent said last named means and operative when an article is discharged from said switch section at either of said discharge points.

13. Apparatus of the character described comprising a main conveyer, a switch section having one end connected to said main conveyer, means for effecting movement of the opposite end of said switch section to either of a plurality of predetermined discharge points, means remote from said switch section for controlling said first named means, and means adjacent said last named means for indicating the discharge point at which said switch section is arranged.

14. Apparatus of the character described comprising a main conveyer, a switch section having one end connected to said main conveyer, means for effecting movement of the opposite end of said switch section to either of a plurality of predetermined discharge points, means remote from said switch section for controlling said first named means, means adjacent said last named means for indicating the discharge point at which said switch section is arranged, and signalling means adjacent said second named means and operative when an article is discharged from said switch section at either of said discharge points.

15. Apparatus of the character described comprising a main conveyer, a switch section having one end connected to said main conveyer, the opposite end of said switch section being movable to either of a plurality of predetermined discharge points, mechanical means including a reversible motor for moving the last named end of said switch section to either of said discharge points, a pair of reversing switches for said motor, and means operative for controlling said switches to render said motor effective for moving the last named end of said switch section to either of said discharge points, said last named means being operative for closing only one of said reversing switches according to the selected direction of movement of said switch section and including a manually operable switch and a holding circuit controlled thereby for rendering said motor operative until said switch section reaches the selected discharge point.

In testimony whereof we affix our signatures.

WILLIAM E. CAIN.
ALLEN E. CRADY.